US012287850B2

(12) United States Patent
Zhuang et al.

(10) Patent No.: US 12,287,850 B2
(45) Date of Patent: Apr. 29, 2025

(54) HANDWRITING GEOMETRY RECOGNITION AND CALIBRATION SYSTEM BY USING NEURAL NETWORK AND MATHEMATICAL FEATURE

(71) Applicants: Jianming Zhuang, Shenzhen (CN); Chung Kwong Chan, Shenzhen (CN)

(72) Inventors: Jianming Zhuang, Shenzhen (CN); Chung Kwong Chan, Shenzhen (CN)

(73) Assignee: SUNIA PTE. LTD, Center (SG)

( * ) Notice: Subject to any disclaimer, the term of this patent is extended or adjusted under 35 U.S.C. 154(b) by 343 days.

(21) Appl. No.: 18/046,160

(22) Filed: Oct. 13, 2022

(65) Prior Publication Data

US 2024/0134938 A1    Apr. 25, 2024

(51) Int. Cl.
*G06F 18/2431* (2023.01)
*G06F 3/04883* (2022.01)
(Continued)

(52) U.S. Cl.
CPC ...... *G06F 18/2431* (2023.01); *G06F 3/04883* (2013.01); *G06F 18/10* (2023.01);
(Continued)

(58) Field of Classification Search
CPC ...... G06F 18/2431; G06F 18/24; G06F 18/10; G06F 18/15; G06F 18/243; G06F 18/24317; G06F 3/014; G06F 3/017; G06F 3/04883; G06F 18/2433; G06V 10/82; G06V 30/186; G06V 30/19173; G06V 30/226; G06V 10/44; G06V 10/457; G06V 10/764; G06V 40/193; G06V 10/20; G06V 10/248; G06V 10/225; G06V 10/22; G06V 10/235; G06V 10/255; G06V 10/422; G06V 10/424; G06V 10/454; G06V 10/46; G06V 20/63;
(Continued)

(56) References Cited

U.S. PATENT DOCUMENTS 5,812,930 A  *  9/1998   Zavrel ................... H04Q 11/00
                                                     725/62

OTHER PUBLICATIONS

Hamdi et al., Handwriting quality analysis using online-offline models, May 24, 2022 [retrieved Nov. 16, 2024], Multimedia Tools and Applications, vol. 81, pp. 43411-43439. DOI: https://doi.org/10.1007/s11042-022-13228-w (Year: 2024).*

(Continued)

*Primary Examiner* — Henok Shiferaw
*Assistant Examiner* — Dennis Rosario (57) ABSTRACT

A handwriting geometry recognition and calibration system by using neural network and mathematical feature includes: a pre-processor for pre-processing coordinate points of geometric figures from user's handwriting so as to get a plurality of sample points which expresses the geometric figures to be recognized; a neural network connected to the pre-processor for receiving the sample points of the geometric figure and recognizing the geometric figure so as to acquire a coarse class of the geometric figure; and an mathematical logic unit connected to the neural network for receiving recognition results from the neural network, including coarse classifications which are used in a secondary classification by using conventional mathematical recognition logics so as to determine an exact geometry shape of the geometric figure; then the geometric figure being calibrated so as to get a geometry with a regular shape.

17 Claims, 5 Drawing Sheets

(51) Int. Cl.
| | |
|---|---|
| *G06F 18/10* | (2023.01) |
| *G06F 18/24* | (2023.01) |
| *G06F 18/243* | (2023.01) |
| *G06N 3/02* | (2006.01) |
| *G06T 7/60* | (2017.01) |
| *G06T 7/64* | (2017.01) |
| *G06V 10/20* | (2022.01) |
| *G06V 10/22* | (2022.01) |
| *G06V 10/422* | (2022.01) |
| *G06V 10/44* | (2022.01) |
| *G06V 10/46* | (2022.01) |
| *G06V 10/72* | (2022.01) |
| *G06V 10/764* | (2022.01) |
| *G06V 10/82* | (2022.01) |
| *G06V 30/10* | (2022.01) |
| *G06V 30/142* | (2022.01) |
| *G06V 30/148* | (2022.01) |
| *G06V 30/18* | (2022.01) |
| *G06V 30/182* | (2022.01) |
| *G06V 30/186* | (2022.01) |
| *G06V 30/19* | (2022.01) |
| *G06V 30/226* | (2022.01) |
| *G06V 30/228* | (2022.01) |
| *G06V 30/242* | (2022.01) |
| *G06V 30/32* | (2022.01) |
| *G06V 40/16* | (2022.01) |
| *G06V 40/30* | (2022.01) |

(52) U.S. Cl.
CPC ........ *G06F 18/24* (2023.01); *G06F 18/24317* (2023.01); *G06N 3/02* (2013.01); *G06T 7/60* (2013.01); *G06T 7/64* (2017.01); *G06V 10/20* (2022.01); *G06V 10/22* (2022.01); *G06V 10/255* (2022.01); *G06V 10/422* (2022.01); *G06V 10/44* (2022.01); *G06V 10/454* (2022.01); *G06V 10/476* (2022.01); *G06V 10/72* (2022.01); *G06V 10/764* (2022.01); *G06V 10/765* (2022.01); *G06V 10/82* (2022.01); *G06V 30/10* (2022.01); *G06V 30/1423* (2022.01); *G06V 30/153* (2022.01); *G06V 30/1801* (2022.01); *G06V 30/1834* (2022.01); *G06V 30/186* (2022.01); *G06V 30/19153* (2022.01); *G06V 30/19173* (2022.01); *G06V 30/19193* (2022.01); *G06V 30/2264* (2022.01); *G06V 30/228* (2022.01); *G06V 30/242* (2022.01); *G06V 30/32* (2022.01); *G06V 30/333* (2022.01); *G06V 30/347* (2022.01); *G06V 30/36* (2022.01); *G06V 40/171* (2022.01); *G06V 40/30* (2022.01); *G06V 40/382* (2022.01); *G06V 40/388* (2022.01); *G06V 40/394* (2022.01); *G06T 2207/20084* (2013.01)

(58) Field of Classification Search
CPC .... G06V 20/62; G06V 20/625; G06V 20/635; G06V 30/153; G06V 30/413; G06V 40/197; G06V 40/171; G06V 40/161; G06V 40/30; G06V 40/20; G06V 40/28; G06V 40/33; G06V 40/37; G06V 40/376; G06V 40/382; G06V 40/394; G06V 40/388; G06V 20/35; G06V 30/36; G06V 30/22; G06V 30/10; G06V 30/1801; G06V 30/1423; G06V 30/2264; G06V 30/228; G06V 30/242; G06V 30/2455; G06V 30/333; G06V 30/32; G06V 30/347; G06V 30/1834; G06V 30/19153; G06V 30/19193; G06V 30/2253; G06V 10/476; G06V 10/70; G06V 10/72; G06V 10/765; G06V 20/41; G06V 30/00; G06V 30/18171; G06T 2207/20084; G06T 2207/20081; G06T 7/13; G06T 7/246; G06T 7/60; G06T 7/64; G06T 9/20; G06N 3/02

See application file for complete search history.

(56) References Cited

OTHER PUBLICATIONS

Yang et al., Structure-based recognition of handwritten chemical operators, Jul. 7-9, 2010 [retrieved Nov. 16, 2024], 2010 8th World Congress on Intelligent Control and Automation, pp. 6371-6374. DOI: 10.1109/WCICA.2010.5554336 (Year: 2010).*

Hse, Practical and Adaptive Multi-Stroke Symbol Recognition [dissertation], 2004 [retrieved Nov. 18, 2024], University of California, Berkeley, 150 pages. Retrieved: https://www.proquest.com/dissertations-theses/practical-adaptive-multi-stroke-symbol/docview/305212438/se-2 (Year: 2004).*

Arica et al., An overview of character recognition focused on off-line handwriting, Aug. 7, 2002, IEEE Transactions on Systems, Man, and Cybernetics, Part C (Applications and Reviews). vol. 21, Issue:2, pp. 216-233. DOI: 10.1109/5326.941845 (Year: 2002).*

Du et al., CRCLoc: A Crowdsourcing-Based Radio Map Construction Method for WiFi Fingerprinting Localization, Jul. 15, 2022 [retrieved Jan. 31, 2025], IEEE Internet of Things Journal, vol. 9, No. 14, pp. 12364-12377. DOI: 10.1109/JIOT.2021.3135700 (Year: 2022).*

Douglas et al., Algorithms for the Reduction of the Number of Points Required to Represent a Digitized Line or Its Caricature, Dec. 1, 1973 [retrieved Jan. 31, 2025], The Canadian Cartographer, vol. 10, No. 2, pp. 112-122. DOI:10.3138/FM57-6770-U75U-7727 (Year: 1973).*

\* cited by examiner

HANDWRITING GEOMETRY RECOGNITION AND CALIBRATION SYSTEM BY USING NEURAL NETWORK AND MATHEMATICAL FEATURE

FIELD OF THE INVENTION

The present invention is related to recognition of handwriting geometric figure, and in particular to handwriting geometry recognition and calibration system by using neural network and mathematical feature.

BACKGROUND OF THE INVENTION

A draft geometric figure is often rough and vague so as to cause the complexity in recognition by machines. With the improvement of computer technology in software and hardware, many research institutes are aimed to develop novel ways for resolving recognition of handwriting draft geometric figures by human machine communication, and there are many novel methods are disclosed, for instance, those based on strokes, figure units, statistics, etc.

Classification of 2D handwriting draft geometries can be classified as online and offline recognitions. For online recognition, a 2D input device (a mouse or a handwriting panel, etc.) is utilized to input strokes of handwriting geometries, while for offline recognition, the geometric figures are scanned or photographed to convent as computer drawings which are further recognized. Online recognition has more messages than those from offline recognition.

In many conventional drawing tools, instructions or buttons are used to input drawing units so as to form desired drawings, such as Microsoft Office, Visio and most of CAD tools. In drawing, the user needs a great number of icons and buttons which define many standard drawings. However, this way has the defects that: the input way is inconvenient. It is often that the user need to select the icons or buttons many times. Especially, if the interface exists a large number of icons or buttons which causes that the user is fuzzy about where these icons or buttons are. Furthermore the input is not natural. Especially, when a user performs a case study, he or she is concentrated himself or herself in the case, while it is a very complex work for he or she to search the icon or button at the same time. Furthermore these interfaces are not adaptable for mobile devices because they have small screens. This is because large number of icons and buttons will fill the whole screen which causes that the user is difficult to find the icons or buttons.

With the continuous developments in hardware, such as handwriting panels, interact handwriting draft gradually becomes a novel drafting way of designers. However, this handwriting drafting has a larger degree of freedom which related to the user's input thought, background of learning field, ways for thought, habits in handwriting and other human characteristics. This causes a very great difficulty in the handwriting draft. Therefore, there is a very large space for the improvement in the recognition and calibration of the handwriting draft of geometric figures.

Therefore, the object of the present invention is to provide a novel way for recognition of geometric figure by neural network and mathematical feature which is aimed to resolve the defects in the prior art.

SUMMARY OF THE INVENTION

To object of the present invention is to provide a novel system which can overcome the defect in the prior art, therefore, the present invention provides a handwriting geometry recognition and calibration system by using neural network and mathematical feature, wherein neural network recognition is combined with conventional mathematical logic technology so as to perform recognition of geometric figures. The ratio of recognition and accuracy are promoted with a great extend. The neural network recognition is used to obtain a coarse classification and then the mathematical logic technology is utilized further to have a fine classification. Furthermore the handwriting geometry figure can be calibrated by the present invention to get a normal geometry shape. The handwriting geometry from different handwriting receiver is capable of being treated and the method of the present invention has verified to be an efficient method and can be widely used in different fields. The accuracy of recognition by the present invention is as higher as 98% and it can recognize a geometric figure rapidly and accurately.

To achieve above object, the present invention provides a handwriting geometry recognition and calibration system by using neural network and mathematical feature, comprising: a mainframe including a processor and a memory connected to the mainframe; a handwriting geometry recognition system installed in the mainframe for recognizing handwriting geometric figure inputted from users, the processor serving for performing operations of the handwriting geometry recognition system; the memory serving to store data and programs of the handwriting geometry recognition system; the handwriting geometry recognition system including: a pre-processor for pre-processing coordinate points of geometric figures from user's handwriting so as to get a plurality of sample points which expresses the geometric FIG. 1 to be recognized; a neural network connected to the pre-processor for receiving the sample points of the geometric figure and recognizing the geometric figure so as to acquire a coarse class of the geometric figure; and an mathematical logic unit connected to the neural network for receiving recognition results from the neural network, including coarse classifications which are used in a secondary classification by using conventional mathematical recognition logics so as to determine an exact geometry shape of the geometric figure; then the geometric figure being calibrated so as to get a geometry with a regular shape.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

With reference to FIGS. 1 to 11, the structure and methodology of the present invention will be include in the following. The present invention includes the following elements.

Figure 1:
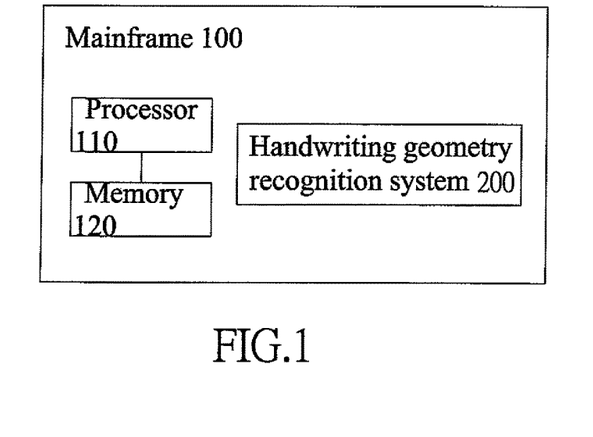
FIG. 1 shows the connection of the system of the present invention.

A mainframe 100, as illustrated in FIG. 1, the main frame 100 includes a processor 110 and a memory 120 connected to the mainframe 110.

Figure 2:
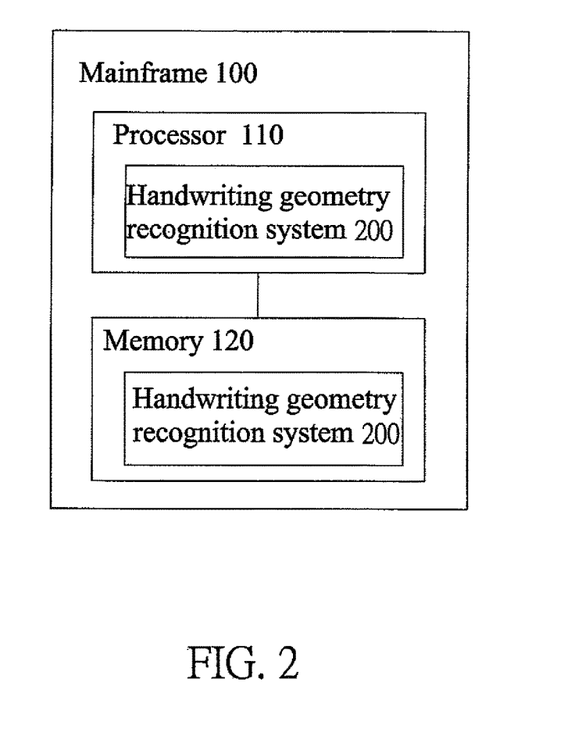
FIG. 2 is a schematic view showing the operation of system of the present invention.

A handwriting geometry recognition system 200 is installed in the mainframe 100 for recognizing handwriting geometries inputted from users. As illustrated in FIG. 2, the processor 110 serves for performing necessary operations of the handwriting geometry recognition system 200. The memory 120 serves to store data and programs of the handwriting geometry recognition system 200.

Figure 3:
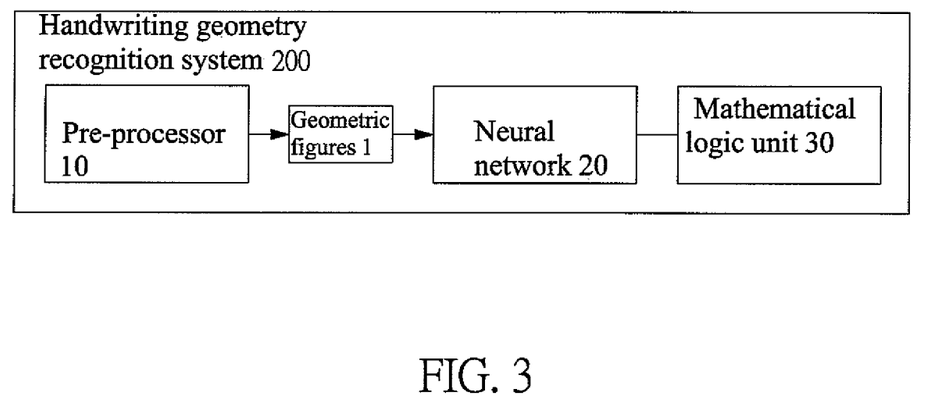
FIG. 3 is a structural block diagram of the main elements of the present invention.

Referring to FIG. 3, the handwriting geometry recognition system 200 includes the following elements.

A pre-processor 10 serves for pre-processing coordinate points of geometric FIG. 1 from user's handwriting so as to get a plurality of sample points 3 which expresses the geometric FIGS. 1 to be recognized.

A neural network 20 is connected to the pre-processor 10 for receiving the sample points 3 of the geometric FIG. 1 and recognizes the geometric FIG. 1 so as to acquire a coarse class of the geometric FIG. 1. The neural network 20 is trained from pre-collecting geometries so as to have the ability of classification of the geometries. In the present invention, the classes of the geometric FIG. 1 recognized by the neural network 20 includes classes of straight lines, circles, ovals, folded lines, triangles, quadrilaterals, pentagons, stars, parabolas, straight lines with arrows, curved or folded lines with arrows, heart shape, or cloud shapes.

An mathematical logic unit 30 is connected to the neural network 20 for receiving recognition results from the neural network 20, including coarse classifications which are used in a secondary classification by using conventional mathematical recognition logics so as to determine an exact geometry shape of the geometric FIG. 1. Then the geometric FIG. 1 is calibrated so as to get a geometry with a regular shape. For example, the geometric FIG. 1 in FIG. 1 is only classified as a triangle in a coarse classification, but cannot assert that it is an equilateral triangle, an isosceles triangle, a right triangle, or a general triangle. Since the neural network 20 has low accuracy to the features of isosceles triangles and equilateral triangles, after a coarse classification of geometric FIG. 1 is acquired, a conventional mathematical logic operation is applied to the geometric FIG. 1 for acquiring an exact class of the geometric FIG. 1.

The exact classes of the present invention about geometric FIG. 1 includes straight lines, circles, ovals, folded lines, general triangles, general quadrilaterals, rectangles, parallelograms, trapeziums, diamond shapes, isosceles, equilateral triangles, regular pentagons, regular stars, parabolas, straight lines with arrows, curved or folded lines with arrows, heart shape, or cloud shapes.

Figure 4:
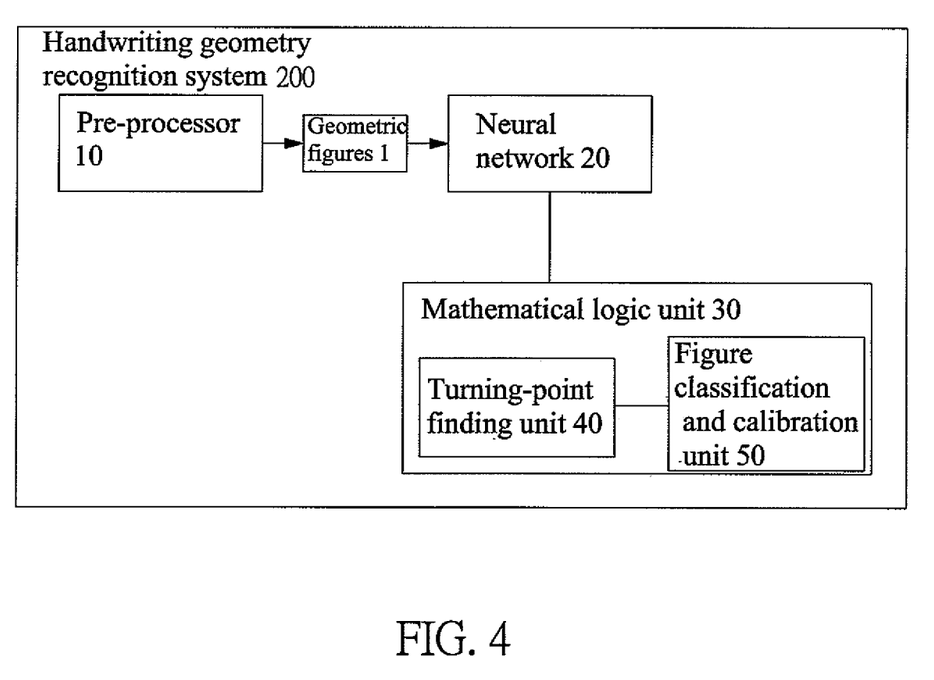
FIG. 4 is an assembled structural view showing the elements of the present invention.

With reference to FIG. 4, the mathematical logic unit 30 further includes following elements.

A turning-point finding unit 40 serves to find turning points to the sample points 3 of geometric FIG. 1 by conventional mathematical logic operation. The turning point is a turning location of the geometric FIG. 1.

A figure classification and calibration unit 50 is connected to the turning-point finding unit 40 for performing a secondary classification to the geometric FIG. 1 based on the coarse classification from the neural network 20 and turning points finding by the turning-point finding unit 40 so as to determine the exact class of the geometric FIG. 1 and calibrate the shape of the geometric FIG. 1. For example, a general pentagon is calibrated as an equilateral pentagon, or the heart shape and cloud shape are calibrated as standard forms.

Figure 5:
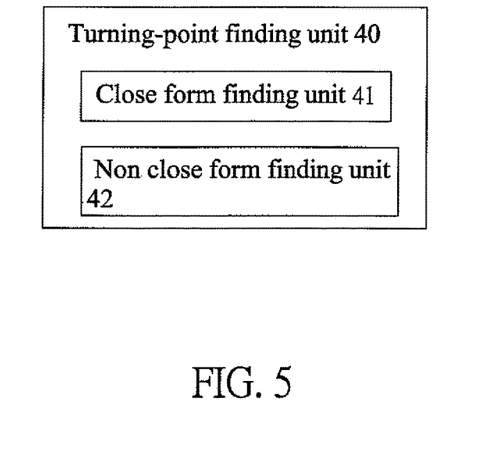
FIG. 5 is a structural schematic view showing the turning-point finding unit of the present invention.

The turning-point finding unit 40 includes a close form finding unit 41 and a non close form finding unit 42, as illustrated in FIG. 5. When the neural network 20 recognizes a geometric FIG. 1 as a triangle, a quadrilateral, a star shape, or an equilateral pentagon, the turning-point finding unit 40 uses the close form finding unit 41 to find the turning points of the geometric FIG. 1. When the neural network 20 recognizes that the geometric FIG. 1 is one of straight lines, folded lines, parabolas, straight lines with arrows, folded lines with arrows, the turning-point finding unit 40 uses the non close form finding unit 42 to find the turning points of the geometric FIG. 1. When the geometric FIG. 1 is a heart shape or a cloud shape, the turning-point finding unit 40 does not process anymore, while it outputs the geometric FIG. 1 to the figure classification and calibration unit 50.

Figure 6:
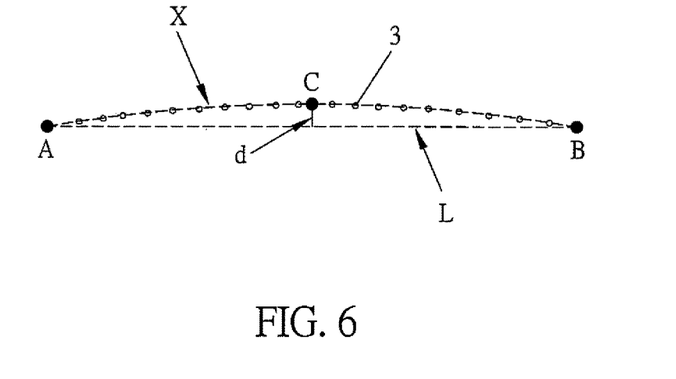
FIG. 6 is a schematic view showing the application of the present invention.
Figure 7:
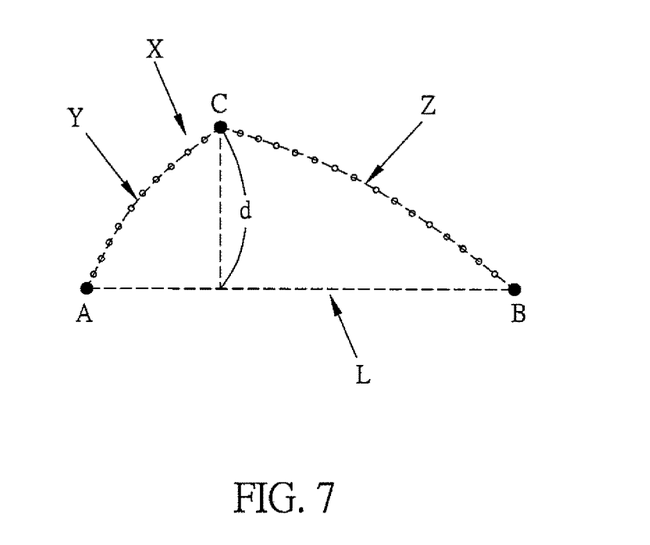
FIG. 7 is another schematic view showing the application of the present invention.

The close form finding unit 41 uses Douglas-Peucker algorithm to find the turning points of geometric FIG. 1, in that, the geometric FIG. 1 is divided into several sections which are overlapped at two ends with other sections. Each section is assembled by sample points 3. Then the turning points of each section are found, as illustrated in FIGS. 6 and 7. The way is that two ends of each section X is connected by a virtual straight line L, while generally the section X is a string line with curvature. A sample point C with a greatest distance d to the virtual straight line L is found out. The distance d is compared with a setting threshold. If the distance d is smaller than the setting threshold, the line L is utilized as an approximate value of the section X. If not, the sampling point C is a turning point which is used to divide the section X into two parts Y and Z, and above process is repeated. All the curve lines in FIG. 1 are processed, all the turning points are connected based on the above processing order. Then an approximate figure of FIG. 1 is acquired.

The non-close form finding unit 42 finds all the turning points in geometric FIG. 1 by the following ways. In FIG. 3, there are n sample points 3 with coordinates $(x_1,y_1)$, $(x_2,y_2)$, $(x_3,y_3)$ ... $(x_n, y_n)$. For each three adjacent sample points $(x_{i-1}, y_{i-1})$, $(x_i, y_i)$ and $(x_{i+1}, y_{i+1})$, curvatures $cur_i$ for sample point 3 $(x_i, y_i)$ are calculated, where $2 \leq i \leq n-1$, in that:

$$\text{Assume } a = \sqrt{(x_{i-1} - x_i)^2 + (y_{i-1} - y_i)^2};$$

$$b = \sqrt{(x_i - x_{i+1})^2 + (y_i - y_{i+1})^2};$$

$$c = \sqrt{(x_{i-1} - x_{i+1})^2 + (y_{i-1} - y_{i+1})^2};$$

$$temp = \frac{a^2 + b^2 - c^2}{2ab};$$

-continued $$\text{Then } cur_i = \frac{2\sqrt{|1-temp^2|}}{c};$$

Assume difference of the curvature $dcur_k=cur_{k+1}-cur_k$, wherein $2\leq k\leq n-2$. Then for a sample point $(x_k,y_k)$ satisfying $dcur_k \times dcur_{k+1}<0$ and $cur_k>$threshold, it is determined as a turning point, in that the setting threshold may be adjusted as desired. The smaller the threshold, the more the turning points in geometric FIG. 1.

The geometric FIG. 1 inputted the close form finding unit 41 can utilize the non-close form finding unit 42 to find the turning points. This is because the close form finding unit 41 exists mistakes to the turning points of geometric FIG. 1 which is more smooth. Therefore, the non-close form finding unit 42 is used as an assistant.

The figure classification and calibration unit 50 make fine classification based on the coarse classification from the neural network and the turning points. When the coarse classification is straight lines, circles, ovals, folded lines, parabolas, straight lines with arrows, curved or folded lines with arrows, heart shape, or cloud shapes. The figure classification and calibration unit 50 makes no further classifications to these geometric FIG. 1. They are viewed as an exact classification.

When the exact classification of the geometric FIG. 1 is a straight line, the first sample point 3 and the last sample point 3 are connected as a final exact straight line.

When the exact classification of the geometric FIG. 1 is a folded line, adjacent turning points are connected as a final exact folded line.

Figure 8:
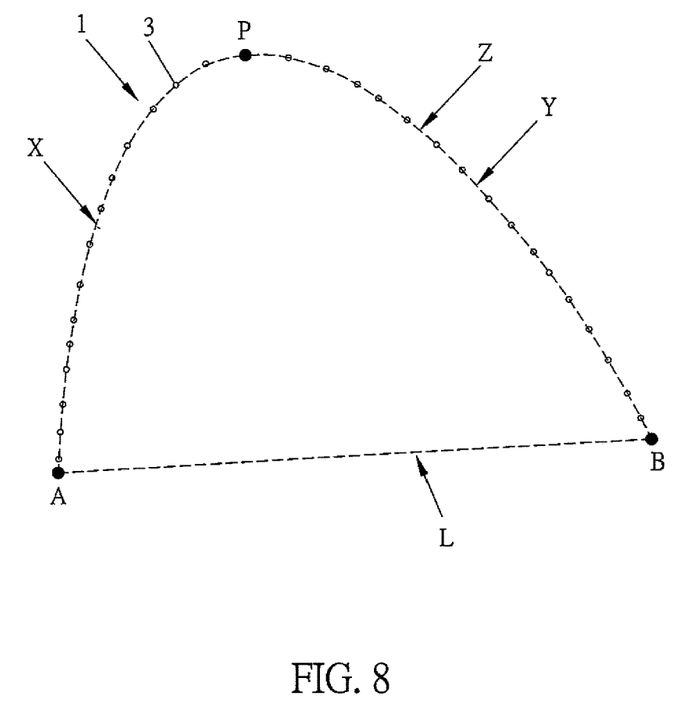
FIG. 8 is a schematic view showing a further application of the present invention.
Figure 9:
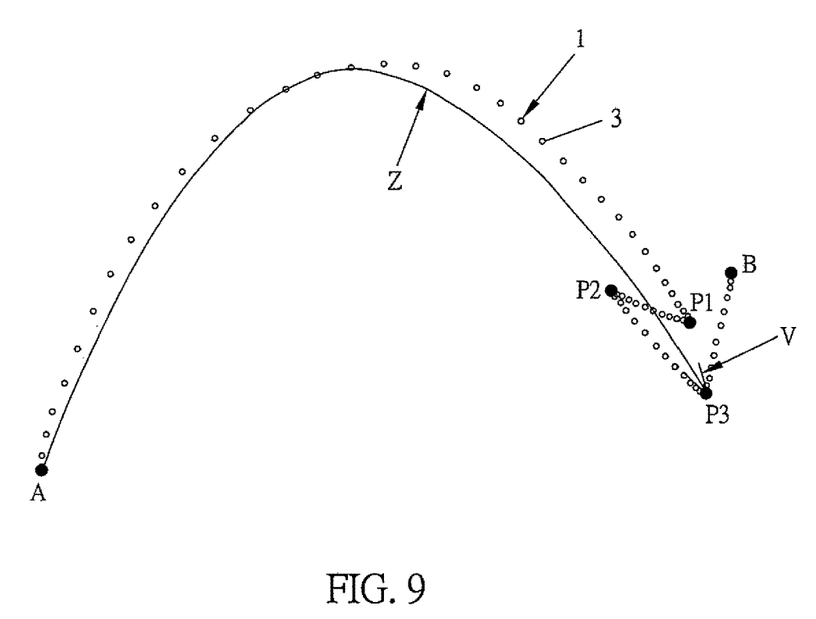
FIG. 9 is a schematic view showing a yet application of the present invention.

When the exact classification of the geometric FIG. 1 is a parabola, as illustrated in FIG. 8, the first sample point A and the last sample point B are connected as a straight line L, a sample point P which has a greatest distance from the straight line is as a top point and by this sample point P, the parabola is divided into two section X and Y. The three order Bezier curve is applied to the sections X and Y so as to acquire the final parabola Z.

When the classification of the geometric FIG. 1 is a straight or curved line with arrow, the arrow is found. If the geometric FIG. 1 is a straight line with arrow, then turning points are utilized to find various line sections of the geometric FIG. 1, the line section with largest length is used as the straight line and other portions are viewed as the arrow. Therefore, the handwriting geometric FIG. 1 is replaced by the straight line and an arrow at one end of the straight line which exists the other portions.

If the geometric FIG. 1 is a curved line with an arrow, lengths of sections of geometric FIG. 1 are found by the turning points. See FIG. 9, a first point A, a last point B, and three turning points P1, P2 and P3 are illustrated with lengths $d1=|A,P1|$, $d2=|P1,P2|$, $d3=|P2,P3|$, and $d3=|P3,B|$. The curve with largest length is a main curve of the geometric FIG. 1, and other portions are viewed as the arrow. Above calibration way for parabola is used to calibrate the main curve so as to get the final parabola Z and add an arrow at the end of the parabola.

When the exact classification of the geometric FIG. 1 is a circle, in calibration, the center of the geometric FIG. 1 is used as a mass center. An average of lengths of all sample points 3 with the mass center is a radius of the circle. Then a circle is obtained from the mass center and the radius.

When the exact classification of the geometric FIG. 1 is an oval, a minimum rectangle containing the geometric FIG. 1 is utilized to get the long axis and short axis of the oval and then an oval is obtained from this long axis and short axis.

When the coarse classification of the geometric FIG. 1 is a triangle, a fine classification is used thereto, wherein three turning points are found so as to obtain three apexes and three lateral lines of the triangle. The three angles of the triangle are calculated. When degrees of the three angles of the triangles are 60±10, it is considered that the triangle is an equilateral triangle. In calibration, the first two turning points are used as two apexes of the equilateral triangle and thus the third point apex can be got and the whole equilateral triangle is obtained.

If only two angles of the triangle are approximately equal, it is determined that it is an isosceles. Then these two angles are utilized as the two angles of the isosceles and two turning points of these two angles are used as two apexes of the isosceles. Therefore, the whole isosceles can be obtained.

When one angle of the triangle is approximately equal to 90 degrees, it is considered that it is a right triangle. If all the three angles of the triangle is not matched to the above mentioned conditions, it is considered that it is a general triangle. Then the three turning points are connected as a triangle without any calibration.

When the coarse classification of geometric FIG. 1 is a quadrilateral. The four turning points are connected as a quadrilateral, if the four inner angles thereof are approximately equal to 90±10, it is determined that it is a rectangle. Then adjacent selected turning points are used to construct one side of the rectangle and a further length approximately vertical to the side is used as another side of the rectangle so that a complete rectangle can be formed.

If two opposite angles of the quadrilateral are approximately equal, it is considered that the it is a parallelogram. If two opposite angles of the quadrilateral are approximately equal and four laterals thereof are approximately equal, it is considered that it is a diamond shape. Then it is calibrated as an exact diamond shape.

If the coarse classification of the geometric FIG. 1 is a right pentagon or a star shape of five apexes, further calibration is performed, wherein five turning points of geometric FIG. 1 are connected, that is each turning point are connected with adjacent second turning points at two sides so as to get an angle. Three are five angles, if four of the five angles are smaller than 90 degrees, it is determined that the pentagon is a right star shape with five apexes, otherwise it is right pentagon. In calibration, a mass center is used as a center and an average length of lengths from all the turning points to the mass center is used as a radius so as to obtain a circle. A selected turning point is used as a first apex of the star shape or the pentagon and then the circle is equally divided into five parts so as to have five apexes which are used as the apexes of the star shape or pentagon. Thereby, a star shape or a pentagon can be acquired.

Figure 10:
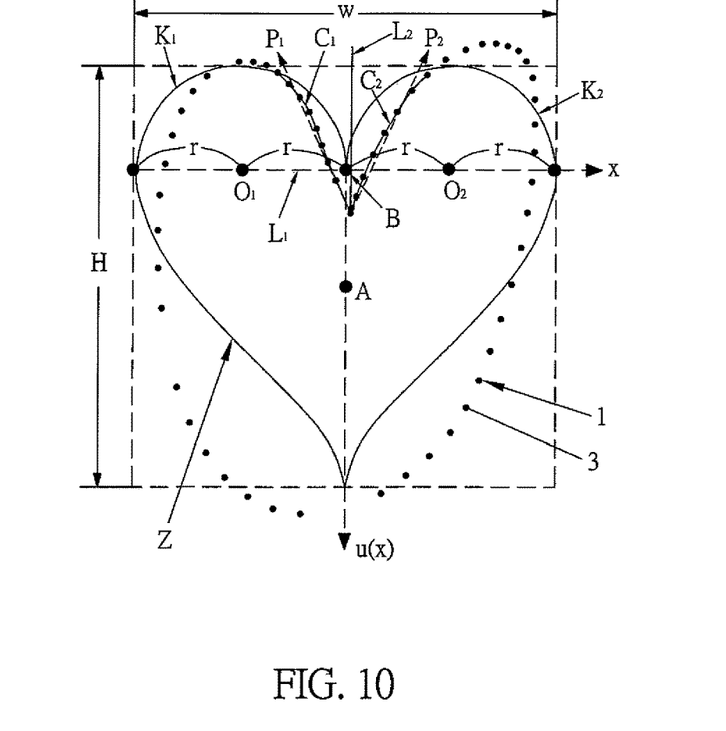
FIG. 10 is a schematic view showing the fifth application of the present invention.

If in coarse classification, it is determined that the geometric FIG. 1 is a heart shape, as illustrated in FIG. 10, in calibration, a minimum rectangle containing the heart shape is obtained, which has a length of H and a width of W. Two semicircles K1, K2 are utilized as the upper halves $$r = \frac{W}{4}.$$

of the heart shape. Each half semicircle has a radius of A mass center of all the sample points 3 of the geometric FIG. 1 is used as a center point A. The center point is utilized as a center of a circle. A concave point B is a point that is a nearest point from the two semicircle K1, K2 to the enter point A, that is a midpoint of a line L1 between the two circles O1 and O2 of the two semicircles. The line L1 is as an X axis and the concave point B is as an original point. The concave point B is as a start point. Two curves C1 and C2 starting from the concave point B along a plurality of sample points which are 1/10 of the original sample points 3 can be obtained. A bisector line L2 bisecting the vectors P1 and P2 most matching two the two curves C1 and C2 (for instance, by minimum square method) shows the direction of the heart shape. The lower half of the heart shape is formed by the formula $$u(x) = -3r\sqrt{1 - \sqrt{\frac{|x|}{2r}}}$$

so as to obtain a corresponding curve, wherein u(x) is coordinate in vertical direction.

Figure 11:
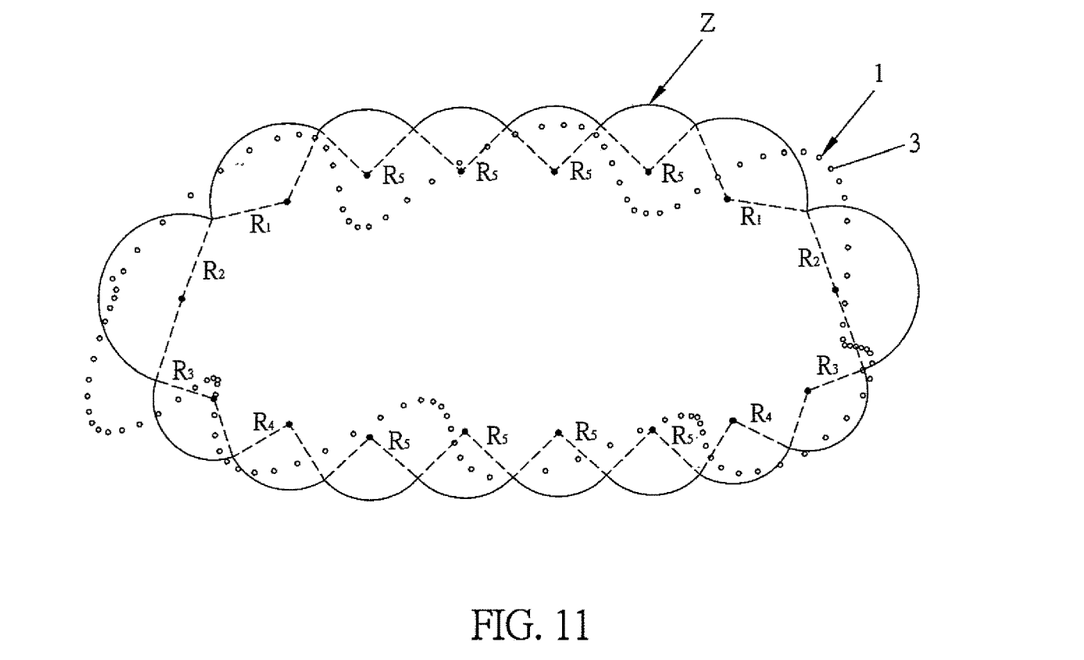
FIG. 11 is a schematic view showing a sixth application of the present invention.

When geometric FIG. 1 is determined to be a cloud shape, as illustrated in FIG. 11. In calibration, a mass center of the all the sample points 3 of geometric FIG. 1 is utilized as a center of a circle. Assume that a minimum rectangle containing all the geometric FIG. 1 has a length L and a width W which are utilized in determining a length of width of the cloud shape. Each of a left and a right side of the cloud shape is connected by four arcs. The first arc has a radius of $$R_1 = \frac{0.25H}{\sqrt{3}\cos 52°},$$

with a central angle of 120 degrees. The second arc has a radius of $$R_2 = \frac{0.23H}{\cos 18°}$$

with a central angle of 180 degrees. The third arc has a radius of of $$R_3 = \frac{0.22\sqrt{2}H}{\sqrt{3}}$$

with a central angle of 120 degrees. The fourth arc has a radius of $$R_4 = \frac{0.07H}{\cos 75°}$$

with a central angle of 90 degrees. All the arcs are connected so as to obtain a cloud shape Z.

Advantages of the present invention are that: neural network recognition is combined with conventional mathematical logic technology so as to perform recognition of geometric figures. The ratio of recognition and accuracy are promoted with a great extend. The neural network recognition is used to obtain a coarse classification and then the mathematical logic technology is utilized further to have a fine classification. Furthermore the handwriting geometry figure can be calibrated by the present invention to get a normal geometry shape. The handwriting geometry from different handwriting receiver is capable of being treated and the method of the present invention has verified to be an efficient method and can be widely used in different fields. The accuracy of recognition by the present invention is as higher as 98% and it can recognize a geometric figure rapidly and accurately.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A handwriting geometry recognition and calibration system by using a neural network and mathematical feature, comprising:

a mainframe including a processor and a memory connected to the mainframe;

a handwriting geometry recognition system installed in the mainframe for recognizing a handwriting geometric figure inputted from users, the processor serving for performing operations of the handwriting geometry recognition system; the memory serving to store data and programs of the handwriting geometry recognition system;

the handwriting geometry recognition system including:

a pre-processor for pre-processing coordinate points of geometric figures from a user's handwriting so as to get a plurality of sample points which expresses the geometric figures to be recognized;

a neural network connected to the pre-processor for receiving the sample points of the geometric figure and recognizing the geometric figure so as to acquire a coarse class of the geometric figure; and an mathematical logic unit connected to the neural network for receiving recognition results from the neural network, including coarse classifications which are used in a secondary classification by using conventional mathematical recognition logics so as to determine an exact geometry shape of the geometric figure; then the geometric figure being calibrated so as to get a geometry with a regular shape:

wherein the arithmetic logic unit comprises:

a turning-point finding unit for finding turning points to the sample points of the geometric figure by mathematical logic operation: the turning point being a turning location of the geometric figure; and a figure classification and calibration unit connected to the turning-point finding unit for performing a secondary classification to the geometric figure based on the coarse classification from the neural network and turning points finding by the turning- point finding unit so as to determine the exact class of the geometric figure and calibrate the shape of the geometric figure.

2. The handwriting geometry recognition and calibration system by using the neural network and mathematical feature, as claimed in claim 1, wherein the neural network is trained from pre-collecting geometries so as to have an ability of coarse classification of the geometries.

3. The handwriting geometry recognition and calibration system by using the neural network and mathematical feature, as claimed in claim 1, wherein the coarse classes of the geometric figure recognized by the neural network includes classes of straight lines, circles, ovals, folded lines, triangles, quadrilaterals, pentagons, stars, parabolas, straight lines with arrows, curved or folded lines with arrows, heart shape, or cloud shapes.

4. The handwriting geometry recognition and calibration system by using the neural network and mathematical feature, as claimed in claim 1, wherein the exact classes of the geometric figure includes straight lines, circles, ovals, folded lines, general triangles, general quadrilaterals, rectangles, parallelolgrams, trapeziums, diamond shapes, isosceles, equilateral triangles, regular pentagons, regular stars, parabolas, straight lines with arrows, curved or folded lines with arrows, heart shape, and cloud shapes.

5. The handwriting geometry recognition and calibration system by using the neural network and mathematical feature, as claimed in claim 1, wherein the turning-point finding unit includes a close form finding unit and a non close form finding unit; when the neural network recognizes a geometric figure as a triangle, a quadrilateral, a star shape, or an equilateral pentagon, the turning-point finding unit uses the close form finding unit to find the turning points of the geometric figure; when the neural network recognizes that the geometric figure is one of straight lines, folded lines, parabolas, straight lines with arrows, folded lines with arrows, the turning-point finding unit uses the non close form finding unit to find the turning points of the geometric figure; when the geometric figure is a heart shape or a cloud shape, the turning-point finding unit does not process anymore, while it outputs the geometric figure to the figure classification and calibration unit.

6. The handwriting geometry recognition and calibration system by using the neural network and mathematical feature, as claimed in claim 5, wherein the close form finding unit uses Douglas-Peucker algorithm to find the turning points of geometric figure, in that, the geometric figure is divided into several sections which are overlapped at two ends with other sections; each section is assembled by sample points; then the turning points of each section are found; the way is that two ends of each section is connected by a virtual straight line, while generally the section is a string line with curvature; a sample point with a greatest distance d to the virtual straight line is found out; the distance is compared with a setting threshold; if the distance is smaller than the setting threshold, the line is utilized as an approximate value of the section;
  if not, the sampling point is a turning point which is used to divide the section into two parts, and above process is repeated; when all the curve lines are processed, all the turning points are connected based on the above processing order; and an approximate figure is acquired.

7. The handwriting geometry recognition and calibration system by using the neural network and mathematical feature, as claimed in claim 5, wherein the non-close form finding unit finds all the turning points in geometric figure by the following ways; there are n sample points with coordinates $(x_1, y_1), (x_2, y_2), (x_3, y_3) \ldots (x_n, Y_n)$; for each three adjacent sample points $(x_{i-1}, y_{i-1})$, $(x_i, y_i)$ and $(x_{i+1}, y_{i+1})$, curvatures $cur_i$ for sample point $(x_i, y_i)$ are calculated, where $2 \leq i \leq n-1$, in that:

$$\text{assume } a = \sqrt{(x_{i-1} - x_i)^2 + (y_{i-1} - y_i)^2};$$

$$b = \sqrt{(x_i - x_{i+1})^2 + (y_i - y_{i+1})^2};$$

$$c = \sqrt{(x_{i-1} - x_{i+1})^2 + (y_{i-1} - y_{i+1})^2};$$

-continued $$temp = \frac{a^2 + b^2 - c^2}{2ab};$$

$$\text{then } cur_i = \frac{2\sqrt{|1 - temp^2|}}{c};$$

assume difference of the curvature $dcur_k = cur_{k+1} - cur_k$, wherein $2 \leq k \leq n-2$; then for a sample point $(x_k, y_k)$ satisfying $dcur_k \times dcur_{k+1} < 0$ and $cur_k >$ threshold,, it is determined as a turning point, in that the setting threshold is adjustable; the smaller the threshold, the more the turning points in geometric figure.

8. The handwriting geometry recognition and calibration system by using the neural network and mathematical feature, as claimed in claim 5, wherein the geometric figure inputted the close form finding unit utilizes the non-close form finding unit to find the turning points.

9. The handwriting geometry recognition and calibration system by using the neural network and mathematical feature, as claimed in claim 1, wherein the figure classification and calibration unit makes fine classification based on the coarse classification from the neural network and the turning points; when the coarse classification is straight lines, circles, ovals, folded lines, parabolas, straight lines with arrows, curved or folded lines with arrows, heart shape, or cloud shapes; the figure classification and calibration unit makes no further classifications to these geometric figures; they are viewed as an exact classification.

10. The handwriting geometry recognition and calibration system by using the neural network and mathematical feature, as claimed in claim 9, wherein when the exact classification of the geometric figure is a straight line, the first sample point and the last sample point are connected as a final exact straight line;
  wherein when the exact classification of the geometric figure is a folded line, adjacent turning points are connected as a final exact folded line;
  wherein when the exact classification of the geometric figure is a parabola, the first sample point and the last sample point are connected as a straight line, a sample point which has a greatest distance from the straight line is as a top point and by this sample point, the parabola is divided into two section; the three order Bezier curve is applied to the two sections so as to acquire the final parabola;
  wherein when the classification of the geometric figure is a straight or curved line with arrow, the arrow is found; if the geometric figure is a straight line with arrow, then turning points are utilized to find various line sections of the geometric figure, the line section with largest length is used as the straight line and other portions are viewed as the arrow;
  therefore, the handwriting geometric figure is replaced by the straight line and an arrow at one end of the straight line which exists the other portions; and
  wherein if the geometric figure is a curved line with an arrow, lengths of sections of geometric figure are found by the turning points, a first point, a last point, and three turning points with lengths of each curves; the curve with largest length is a main curve of the geometric figure, and other portions are viewed as the arrow; above calibration way for parabola is used to calibrate the main curve so as to get the final parabola and add an arrow at the end of the parabola.

11. The handwriting geometry recognition and calibration system by using the neural network and mathematical feature, as claimed in claim 9, wherein when the exact classification of the geometric figure is a circle, in calibration, the center of the geometric figure is used as a mass center; an average of lengths of all sample points with the mass center is a radius of the circle; then a circle is obtained from the mass center and the radius.

12. The handwriting geometry recognition and calibration system by using the neural network and mathematical feature, as claimed in claim 9, wherein when the exact classification of the geometric figure is an oval, a minimum rectangle containing the geometric figure is utilized to get the long axis and short axis of the oval and then an oval is obtained from this long axis and short axis.

13. The handwriting geometry recognition and calibration system by using the neural network and mathematical feature, as claimed in claim 9, wherein when the coarse classification of the geometric figure is a triangle, a fine classification is used thereto, wherein three turning points are found so as to obtain three apexes and three lateral lines of the triangle; the three angles of the triangle are calculated; when degrees of the three angles of the triangles are 60±10, it is considered that the triangle is an equilateral triangle; in calibration, the first two turning points are used as two apexes of the equilateral triangle and thus the third point apex can be got and the whole equilateral triangle is obtained; if only two angles of the triangle are approximately equal, it is determined that it is an isosceles; then these two angles are utilized as the two angles of the isosceles and two turning points of these two angles are used as two apexes of the isosceles; therefore, the whole isosceles can be obtained; when one angle of the triangle is approximately equal to 90 degrees, it is considered that it is a right triangle; if all the three angles of the triangle is not matched to the above mentioned conditions, it is considered that it is a general triangle; then the three turning points are connected as a triangle without any calibration.

14. The handwriting geometry recognition and calibration system by using the neural network and mathematical feature, as claimed in claim 9, wherein when the coarse classification of geometric figure is a quadrilateral; the four turning points are connected as a quadrilateral, if the four inner angles thereof are approximately equal to 9 10, it is determined that it is a rectangle; then adjacent selected turning points are used to construct one .side of the rectangle and a further length approximately vertical to the side is used as another side of the rectangle so that a complete rectangle can be formed; if two opposite angles of the quadrilateral are approximately equal, it is considered that the it is a parallelogram; if two opposite angles of the quadrilateral are approximately equal and four laterals thereof are approximately equal, it is considered that it is a diamond shape; then it is calibrated as an exact diamond shape.

15. The handwriting geometry recognition and calibration system by using the neural network and mathematical feature, as claimed in claim 9, wherein if the coarse classification of the geometric figure is a right pentagon or a star shape of five apexes, further calibration is performed, wherein five turning points of geometric figure are connected, that is each turning point are connected with adjacent second turning points at two sides so as to get an angle; three are five angles, if four of the five angles are smaller than 90 degrees, it is determined that the pentagon is a right star shape with five apexes, otherwise it is right pentagon; in calibration, a mass center is used as a center and an average length of lengths from all the turning points to the mass center is used as a radius so as to obtain a circle; a selected turning point is used as a first apex of the star shape or the pentagon and then the circle is equally divided into five parts so as to have five apexes which are used as the apexes of the star shape or pentagon; thereby, a star shape or a pentagon can be acquired.

16. The handwriting geometry recognition and calibration system by using the neural network and mathematical feature, as claimed in claim 9, wherein when geometric figure is determined to be a cloud shape; in calibration, a mass center of the all the sample points of geometric figure is utilized as a center of a circle; assume that a minimum rectangle containing all the geometric figure has a length L and a width W which are utilized in determining a length of width of the cloud shape; each of a left and a right side of the cloud shape is connected by four arcs; the first arc has a radius of $$R_1 = \frac{0.25H}{\sqrt{3}\cos 52°},$$

with a central angle of 120 degrees; the second arc has a radius of $$R_2 = \frac{0.23H}{\cos 18°}$$

with a central angle of 180 degrees; the third arc has a radius of $$R_3 = \frac{0.22\sqrt{2}H}{\sqrt{3}}$$

with a a central angle of 120 degrees; the fourth arc has a radius of $$R_4 = \frac{0.07H}{\cos 75°}$$

with a central angle of 90 degrees; all the arcs are connected so as to obtain a cloud shape.

17. The handwriting geometry recognition and calibration system by using the neural network and mathematical feature, as claimed in claim 1, wherein if in coarse classification, it is determined that the geometric figure is a heart shape, in calibration, a minimum rectangle containing the heart shape is obtained, which has a length of H and a width of W; two semicircles K1, K2 are utilized as the upper halves of the heart shape; each half semicircle has a radius of $$r = \frac{W}{4};$$

amass center of all the sample points of the geometric figure is used as a center point; the center point is utilized as a center of a circle; a concave point is a point that is a nearest point from the two semicircle K1, K2 to the center point A, that is a midpoint of a line L1 between the two circles O1 and O2 of the two semicircles; the line L1 is as an X axis and the concave point B is as an original point; the concave point B is as a start point; two curves C1 and C2 starting from the concave point B along a plurality of sample points which are 1/100 of the original sample points 3 can be obtained; abisector line L2 bisecting the vectors P1 and P2 most matching two the two curves C1 and C2 shows the direction of the heart shape; the lower half of the heart shape is formed by the formula $$u(x) = -3r\sqrt{1 - \sqrt{\frac{|x|}{2r}}}$$

so as to obtain a corresponding curve, wherein u (x) is coordinate in vertical direction.

* * * * *